United States Patent
Kamatani et al.

(10) Patent No.: US 9,471,568 B2
(45) Date of Patent: Oct. 18, 2016

(54) SPEECH TRANSLATION APPARATUS, SPEECH TRANSLATION METHOD, AND NON-TRANSITORY COMPUTER READABLE MEDIUM THEREOF

(71) Applicant: KABUSHIKI KAISHA TOSHIBA, Minato-ku, Tokyo (JP)

(72) Inventors: Satoshi Kamatani, Kanagawa-ken (JP); Kazuo Sumita, Kanagawa-ken (JP); Akinori Kawamura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 48 days.

(21) Appl. No.: 14/484,483

(22) Filed: Sep. 12, 2014

(65) Prior Publication Data

US 2015/0081270 A1 Mar. 19, 2015

(30) Foreign Application Priority Data

Sep. 19, 2013 (JP) .................................. 2013-194021

(51) Int. Cl.
*G06F 17/28* (2006.01)
*G10L 15/00* (2013.01)
*G10L 15/065* (2013.01)

(52) U.S. Cl.
CPC ........... *G06F 17/289* (2013.01); *G10L 15/005* (2013.01); *G10L 15/065* (2013.01)

(58) Field of Classification Search
CPC ..... G10L 15/00; G10L 15/005; G10L 15/01; G10L 15/187; G10L 15/24; G06F 17/27; G06F 17/2705; G06F 17/35275; G06F 17/2756; G06F 17/28; G06F 17/2854; G06F 17/2872; G06F 17/2881; G06F 17/30; G06F 17/2735; G06F 17/275

USPC ........ 704/2, 4, 5, 7, 8, 9, 10, 231, 251, 257, 704/277
See application file for complete search history.

(56) References Cited

U.S. PATENT DOCUMENTS

| | | | |
|---|---|---|---|
| 6,952,675 B1 | 10/2005 | Tahara et al. |
| 7,904,291 B2 | 3/2011 | Kamatani et al. |
| 7,974,844 B2 | 7/2011 | Sumita |
| 8,204,739 B2 | 6/2012 | Waibel et al. |

(Continued)

FOREIGN PATENT DOCUMENTS

| | | |
|---|---|---|
| JP | 10-269221 | 10/1998 |
| JP | 2001-092485 | 4/2001 |

(Continued)

*Primary Examiner* — Qi Han
(74) *Attorney, Agent, or Firm* — Amin, Turocy & Watson LLP

(57) ABSTRACT

According to one embodiment, a speech of a first language is recognized using a speech recognition dictionary to recognize the first language and a second language, and a source sentence of the first language is generated. The source sentence is translated into a second language, and a translation sentence of the second language is generated. An unknown word included in the translation sentence is detected. The unknown word is not stored in the speech recognition dictionary. A first pronunciation candidate of the unknown word is estimated, from a representation of the unknown word. A second pronunciation candidate of the unknown word is estimated from a pronunciation of an original word included in the source sentence corresponding to the unknown word. The unknown word, the first pronunciation candidate and the second pronunciation candidate, are registered into the speech recognition dictionary correspondingly.

9 Claims, 9 Drawing Sheets

(56) References Cited

U.S. PATENT DOCUMENTS

| | | | |
|---|---|---|---|
| 2009/0024392 A1* | 1/2009 | Koshinaka | G10L 15/06 704/257 |
| 2011/0307241 A1 | 12/2011 | Waibel et al. | |
| 2011/0320468 A1* | 12/2011 | Child | G06F 17/2223 707/756 |
| 2014/0149103 A1* | 5/2014 | Child | G06F 3/018 704/8 |

FOREIGN PATENT DOCUMENTS

| | | |
|---|---|---|
| JP | 2002-014693 | 1/2002 |
| JP | 2003-186494 | 7/2003 |
| JP | 2007-004730 | 1/2007 |
| JP | 2007-256836 | 10/2007 |
| JP | 2010-164918 | 7/2010 |
| WO | 2009-129315 | 10/2009 |

* cited by examiner

| SOURCE LANGUAGE UTTERANCE | MITODENATTOUWOTABETAKOTOGAARIMASUKA |

| SPEECH RECOGNITION RESULT | 水戸で納豆を食べたことがありますか？ |

| TRANSLATION RESULT | 您在水户吃过纳豆吗？ |

FIG.3

| UNKNOWN WORD A | 水户 |
|---|---|
| UNKNOWN WORD B | 纳豆 |

UNKNOWN WORD SET U = { 水户, 纳豆 }

FIG.4

|   | A | I | U | E | O |
|---|---|---|---|---|---|
| : | : | : | : | : | : |
| T | ta | chi | tu | te | tou |
| N | na | ni | nu | ne | nuo |
| : | : | : | : | : | : |

FIG.5

| UNKNOWN WORD | PRONUNCIATION CANDIDATE | |
|---|---|---|
| 水户 | shui3hu4 | mi1tou |
| 纳豆 | na4dou4 | na4tuo2 |

FIG.6

|  | A | I | U | E | O |
|---|---|---|---|---|---|
| : | : | : | : | : | : |
| TA | ta | chi | tu | te | tou |
| NA | na | ni | nu | ne | nuo |
| : | : | : | : | : | : |
| ‥ | ‥ | TOA | ta | TOI | dui |
| TOU | tou | TOE | te | ‥ | ‥ |

FIG.8

| UNKNOWN WORD | SPEECH SOUND |
|---|---|
| 水户 | MITO |
| 纳豆 | NATTOU |

FIG.9A

| UNKNOWN WORD | SPEECH SOUND | PRONUNCIATION CANDIDATE |
|---|---|---|
| 水户 | MITO | mi1tou |
| 纳豆 | NATTOU | na2tuo2 |

FIG.9B

| UNKNOWN WORD | PRONUNCIATION CANDIDATE | | |
|---|---|---|---|
| 水户 | shui3hu4 | mi1tou | |
| 纳豆 | na4dou4 | na4tuo2 | na2tuo2 |

FIG.9C

| PRONUNCIATION CANDIDATE | PREFERENCE 1 | PREFERENCE 2 |
|---|---|---|
| na4tuo2 | 纳豆 | 那头 |
| na2tuo2 | 纳豆 | — | ns system): na4dou4) and English word "Natto". When a foreigner watches this translation result and tries to utter this word in next speech, except for utterance by watching representation
SPEECH TRANSLATION APPARATUS, SPEECH TRANSLATION METHOD, AND NON-TRANSITORY COMPUTER READABLE MEDIUM THEREOF

CROSS-REFERENCE TO RELATED APPLICATION

This application is based upon and claims the benefit of priority from Japanese Patent Application No. 2013-194021, filed on Sep. 19, 2013; the entire contents of which are incorporated herein by reference.

FIELD

Embodiments described herein relate generally to a speech translation apparatus, a speech translation method, and a non-transitory computer readable medium.

BACKGROUND

There is a machine translation device to accept an input of a character string of source language described in a first language and to translate the character string into another character string described by a second language (a user's desired language). Furthermore, by recent development of speech language processing technique, a speech translation device to translate a speech of the first language uttered by one user (a first speaker) into the second language and to output to the other user (a second speaker), is realized.

In a speech recognition dictionary and a translation dictionary used by the speech translation device presently, vocabularies in a range provided by the developer are only stored. Especially, in the speech translation device, by limiting or switching recognizable vocabularies and translatable vocabularies based on a scene or a situation where this device is used, the performance is improved. This reason can be imagined by a fact that, if a user hears a talk with premise knowledge to some extent, it is easier for the user to understand the talk than hearing the talk without the premise knowledge.

On the other hand, technique to translate a new word of the first language into the second language and to register this translation result into the speech recognition dictionary for the second language, is disclosed in PCT international publication number WO 2009/129315.

In actual conversation via a speech interpretation device, by hearing mutual utterances and by confirming respective interpretation results between first and second speakers, the conversation is advanced. As to a word not existed in the other party's language (the second speaker's language), for example, in translation from Japanese to Chinese, or translation from Japanese to English, this word is transliterated into representation in the Latin alphabet. Furthermore, in translation from English to Japanese, this word is outputted as it is by representation in the alphabet, or transliterated into representation in the Japanese syllabary (the square form of kana).

In this case, when the other party (the second speaker) cannot estimate speech from representation of the translation result, the other party often utters based on the first speaker's utterance. Accordingly, if the speech recognition dictionary is updated by only representation of the word according to conventional technique, the word is not correctly recognized by uttering the word with different pronunciation from the speech recognition dictionary.

For example, Japanese word "納豆 (Nattou)" (fermented soybeans) is thought about. This word is translated into Chinese word "納豆" (Pinyin (Chinese Romanization system): na4dou4) and English word "Natto". When a foreigner watches this translation result and tries to utter this word in next speech, except for utterance by watching representation of his/her native tongue, the foreigner generally utters by imitating Japanese pronunciation "Nattou". This Japanese pronunciation "Nattou" is not directly related to Chinese word "納豆" and English word "Natto". Accordingly, in conventional technique to recognize the foreigner's utterance by using only a pronunciation estimated from the character string of the translation result, the speech recognition of the foreigner's utterance is failed.

Furthermore, in order to raise the translation accuracy, it is considered that all translatable words and all words acquired as translation results are previously registered into the speech recognition dictionary. However, if the number of recognizable words is increased disorderly, possibility to generate incorrect words having utterances similar to the correct word is raised. As a result, the interpretation accuracy is not always improved.

BRIEF DESCRIPTION OF THE DRAWINGS

FIG. 3 is one example of a speech recognition result and a translation result corresponding to a source language pronunciation.

FIG. 4 is unknown words A and B detected from the translation result of FIG. 3.

FIG. 5 is one example of a pronunciation correspondence table according to the first embodiment.

FIG. 6 is one example of pronunciation candidates registered into a speech recognition dictionary according to the first embodiment.

FIG. 8 is one example of an interlingual pronunciation correspondence table according to the second embodiment.

FIGS. 9A, 9B and 9C are one example of processing to extract pronunciation candidates of unknown words according to the second embodiment.

DETAILED DESCRIPTION

According to one embodiment, a speech translation apparatus includes a speech recognition unit, a translation unit, an unknown word detection unit, a pronunciation estimation unit, and a dictionary update unit. The speech recognition unit is configured to convert a speech of a first language to a source sentence of the first language by recognizing the speech using a speech recognition dictionary to recognize the first language and a second language. The translation unit is configured to convert the source sentence to a translation sentence of the second language. The unknown word detection unit is configured to detect an unknown word included in the translation sentence. The unknown word is not stored in the speech recognition dictionary. The pronunciation estimation unit is configured to estimate a first pronunciation candidate of the unknown word from a representation of the unknown word, and to estimate a second pronunciation candidate of the unknown word from a pronunciation of an original word included in the source sentence corresponding to the unknown word. The dictionary update unit is configured to register the unknown word, the first pronunciation candidate and the second pronunciation candidate, into the speech recognition dictionary correspondingly.

Various embodiments will be described hereinafter with reference to the accompanying drawings.

In following embodiments, as the assumption, a speech translation from the first language into the second language will be explained. However, the translation direction may be the reverse. Furthermore, even if the speech translation apparatus applies a mechanism to simultaneously process a plurality of languages, it is apparent that the translation direction can be treated in similar way.

Figure 1:
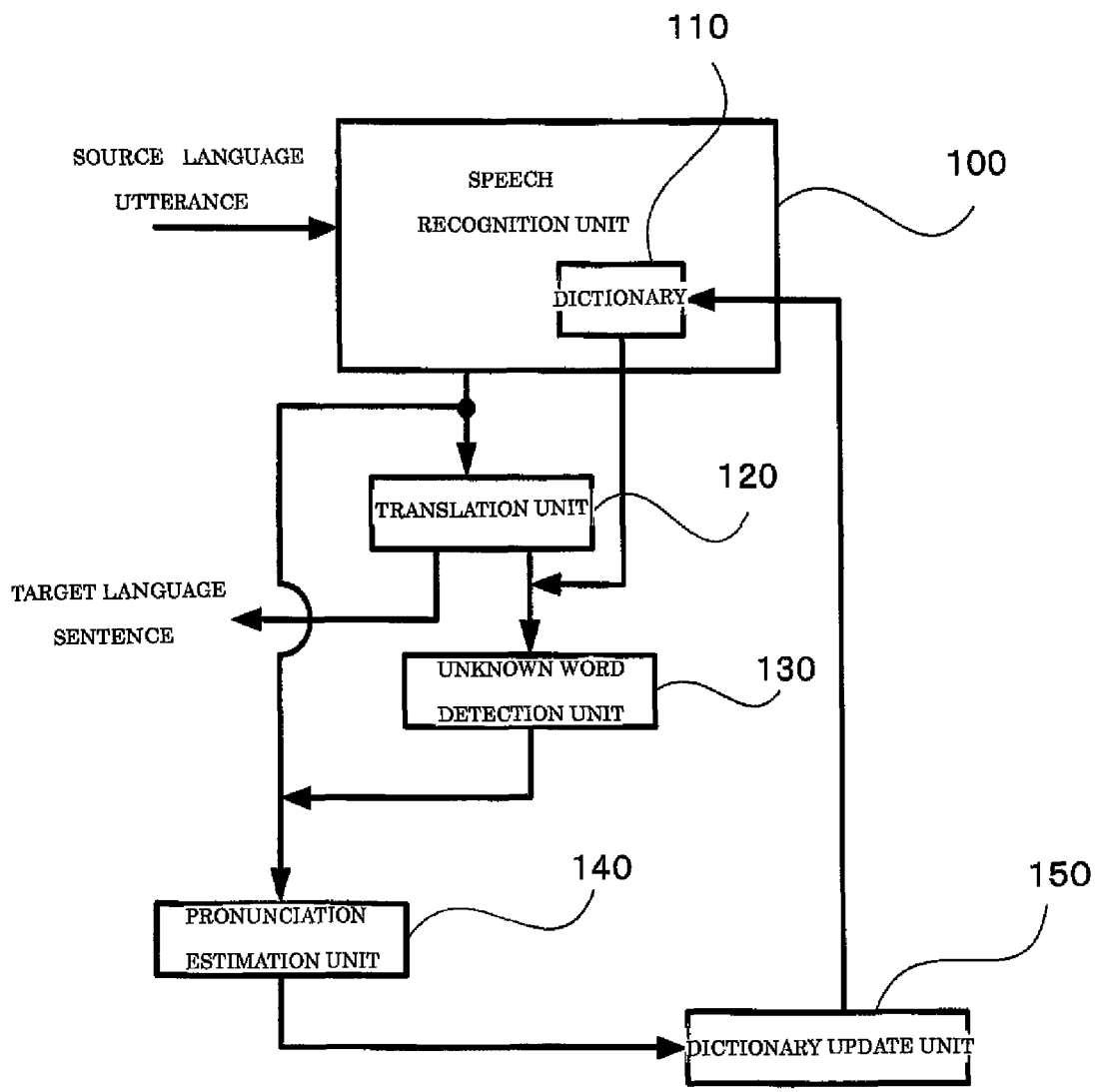
FIG. 1 is a block diagram of a speech translation apparatus according to various embodiments.

FIG. 1 is a block diagram of inside component of the speech translation apparatus according to various embodiments. As shown in FIG. 1, the speech translation apparatus includes a speech recognition unit 100, a translation unit 120, an unknown word detection unit 130, a pronunciation estimation unit 140, and a dictionary update unit 150. The speech recognition unit 100 connects a speech recognition dictionary 110 internally or externally.

The speech recognition unit 100 accepts the user's (speaker) utterance as a speech signal. For example, this speech signal can collected via a microphone and acquired via analog/digital converter (A/D converter). Furthermore, the speech signal may be accepted by reading a speech (previously recorded) via a recording medium. The speech recognition unit 100 converts the accepted speech signal to a text character string corresponding thereto using speech recognition technique by referring to the speech recognition dictionary 110. As the speech recognition technique (Automatic Speech Recognition) used by the speech recognition unit 100, conventional technique widely known in general, such as Hidden Markov Model Method, is used. Here, the explanation is omitted.

The translation unit 120 converts a source language sentence of the first language (outputted by the speech recognition unit 100) to a target language sentence of the second language by referring to a translation dictionary (not shown in FIG. 1), and outputs the target language sentence. As translation processing of the translation unit 120, various methods used in conventional Machine Translation technique, such as a general transfer method, an example-based method, a statistical method, an interlingual method, can be applied.

The unknown word detection unit 130 detects an unknown word using the speech recognition unit 100, from the target language sentence as the translation result by the translation unit 120. For example, if at least one word included in the target language sentence is not registered in the speech recognition dictionary referred to recognize the second language, this word is detected as the unknown word.

The pronunciation estimation unit 140 estimates a pronunciation of each unknown word in a set of unknown words (outputted by the unknown word detection unit 130). As the estimation method, Speech Synthesis (Text-To-Speech) technique can be used. The explanation is omitted.

Furthermore, the pronunciation estimation unit 140 estimates a pronunciation, based on a word of the first language corresponding to the unknown word of the second language. Hereafter, this process to estimate a pronunciation is called "pronunciation-estimation from the source language". Here, a pronunciation by the first language may be estimated from representation of a word in the source language sentence corresponding to the unknown word of the second language. Furthermore, this pronunciation may be estimated based on waveform information of an utterance sound of the first language equivalent to the word in the source language sentence corresponding to the unknown word.

For example, "pronunciation-estimation from the source language" is used by creating a rule or a sound correspondence table between the first language and the second language. Furthermore, by collecting a pair of pronunciations of the first language and the second language on a large scale, and by modeling a change pattern therebetween using machine learning, a method for statistically estimating a pronunciation of new unknown word can be applied.

The dictionary update unit 150 corresponds an unknown word (detected by the unknown word detection unit 130) with a pronunciation estimated by the pronunciation estimation unit 140, and registers the unknown word into the dictionary 110 referred by the speech recognition unit 100.

Furthermore, the dictionary update unit 150 updates a pair of the unknown word and the pronunciation (newly registered) so as to be preferentially selected in speech recognition processing by the speech recognition unit 100. For example, while the speech recognition unit 100 is operating, if the unknown word (registered so as to be preferentially selected) is included in candidates, the speech recognition unit 100 preferentially selects this unknown word. This unknown word may be registered so that the priority degree is lowered with passage of time, or deleted from registration after a series of dialog is completed.

Hereafter, operation of the speech translation apparatus of various embodiments will be explained. In following explanation, the first language is Japanese, and the second language is Chinese. However, this principle can be applied to two different languages.

The First Embodiment

Figure 2:
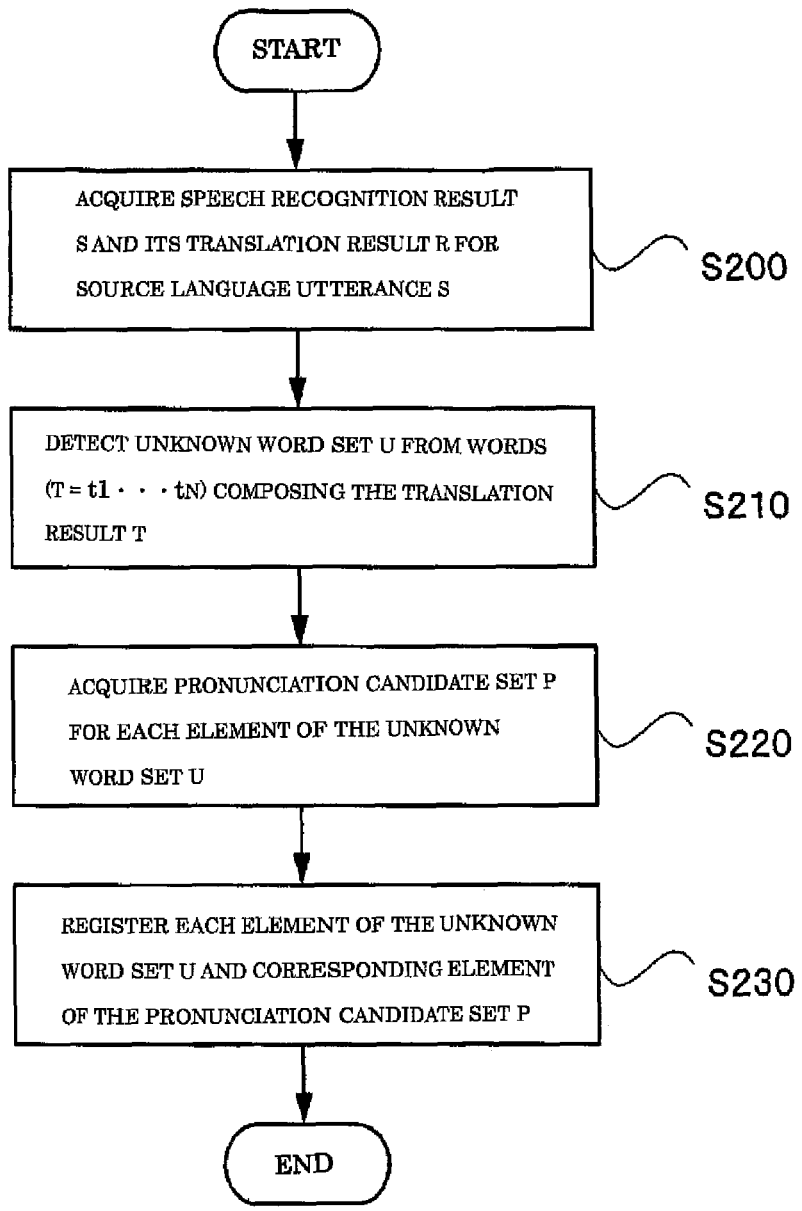
FIG. 2 is a flow chart of processing of the speech translation apparatus according to the first embodiment.

FIG. 2 is a flow chart of processing of the speech translation apparatus according to the first embodiment. Hereafter, by showing concrete examples with the flow chart of FIG. 2, each processing will be explained.

Now, as shown in the upper line of FIG. 3, as a source language utterance S, "MITODENATTOUWOTABETA-KOTOGAARIMASUKA" is inputted to the speech recognition unit 100. Next, as shown in the middle line of FIG. 3, the speech recognition unit 100 outputs the speech recognition result R "水戸で納豆を食べたことがありますか?" (Have you ever eaten fermented soybeans at Mito?). Next, as shown in the lower line of FIG. 3, the translation unit 120 acquires the Chinese translation result T (S200).

Then, in process to acquire the Chinese translation result T, as shown in FIG. 4, an unknown word set U including two unknown words A and B are detected by the unknown word detection unit 130 because they are not registered in the speech recognition dictionary 110 of Chinese. The unknown word set U is outputted to the pronunciation estimation unit 140 (S210). Hereafter, as to two Chinese words "水戸" and "納豆", these words indicate following Chinese representations.

「水户」「纳豆」

Next, as to each unknown word as elements of the unknown word set U, the pronunciation estimation unit 140 estimates the pronunciation. Here, in the speech translation apparatus of the first embodiment, first, the pronunciation is estimated from a representation of unregistered word in the second language (Chinese) of each unknown word. For example, as to a Chinese word "水戸", a pronunciation candidate "shui3hu4" is acquired. As to a Chinese word "納豆", a pronunciation candidate "na4dou4" is acquired.

Furthermore, the pronunciation estimation unit 140 estimates a pronunciation candidate from a pronunciation of a source language word in the first language of each unknown word, i.e., "MITO" corresponding to "水戸", and "NATTOU" corresponding to "納豆". In this estimation, by using an interlingual pronunciation correspondence table shown in FIG. 5, the pronunciation candidate is converted. As a result, as to the Chinese word "水戸", "mi1tou" is acquired. As to the Chinese word "納,豆", "na4tuo2" is acquired.

By above-mentioned estimation processing of two pronunciation candidates, as shown in FIG. 6, as the pronunciation candidate of the Chinese word "水戸", "shui3hu4" and "mi1tou" are acquired. As the pronunciation candidate of the Chinese word "納豆", "na4dou4" and "na4tuo2" are acquired. In this way, a pronunciation candidate set P is acquired (S220).

The dictionary update unit 150 corresponds each unknown word (included in the unknown word set U) with the pronunciation candidate set P (estimated by the dictionary update unit 150), and registers into the speech recognition dictionary 110 of Chinese (S230).

By above-mentioned processing, a pronunciation having possibility that the Chinese speaker utters can be registered into the speech recognition dictionary 110, based on knowledge of Japanese. Accordingly, as to a pronunciation having high possibility that the Chinese speaker uses in flow of conversation, a word corresponding to this pronunciation can be recognized as a speech. As a result, recognition accuracy of speech recognition in speech conversation is improved, and interpretation by the speech translation apparatus can be improved.

By the way, in the first embodiment, speech input is not always necessary. This reason is apparent from a fact that, the pronunciation of Chinese is estimated without reference to information of original utterance of Japanese. As a replacement of the speech input, a source language sentence as a translation target can be inputted via a touch screen, a mouse, a keyboard, and a hand-writing.

Next, for example, the Chinese speaker utters the Chinese word "納豆" by not a Chinese pronunciation "na4dou4" but similar Chinese pronunciation "na2tuo2", based on knowledge of Japanese of the Chinese speaker. Here, in the first embodiment, as to the Chinese word "納豆", the pronunciation candidate "na2tuo2" is not included. Accordingly, the speech recognition result desired by the Chinese speaker is not acquired. In the second embodiment, this problem is solved.

The Second Embodiment

Figure 7:
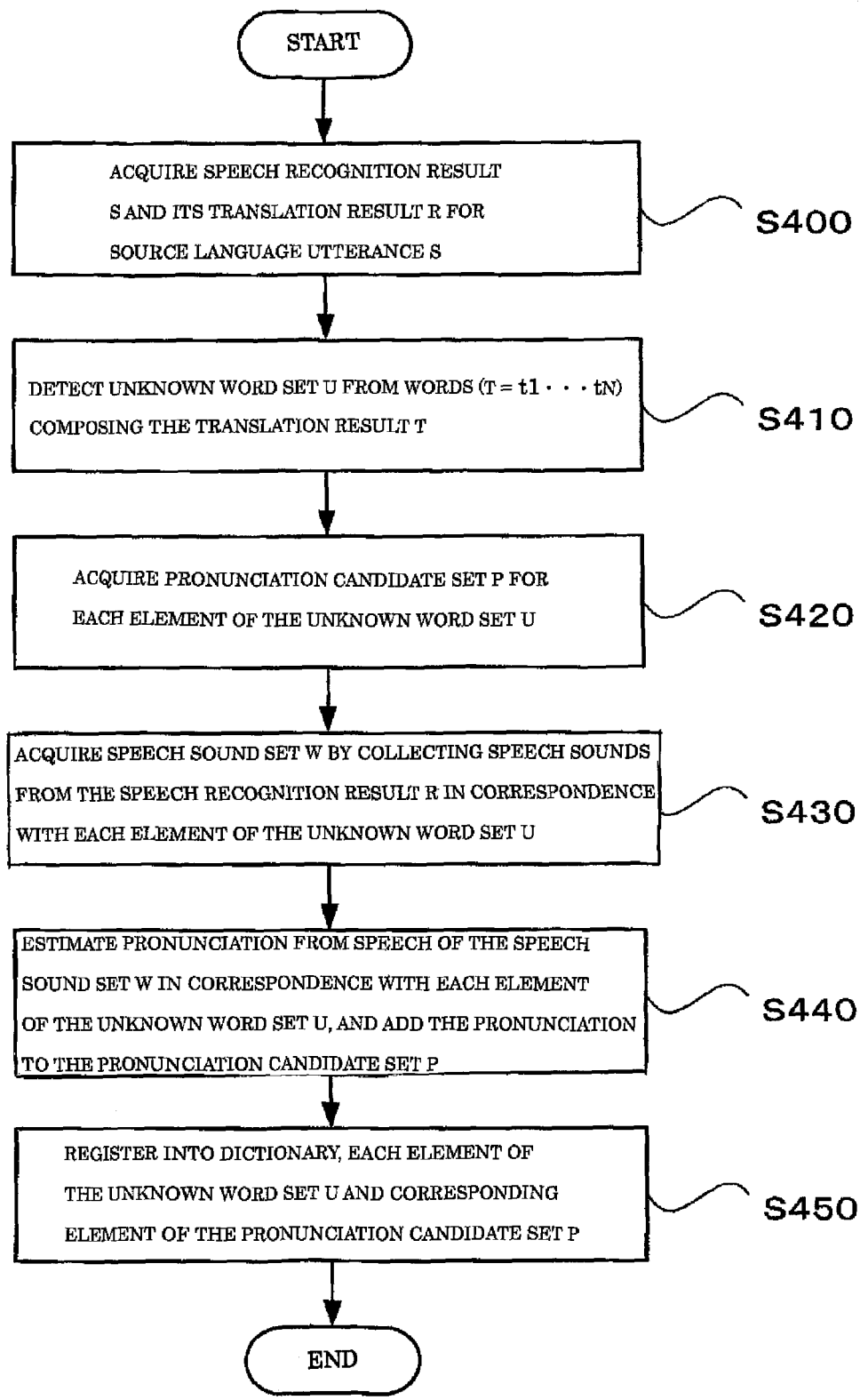
FIG. 7 is a flow chart of processing of the speech translation apparatus according to the second embodiment.

The second embodiment will be explained. FIG. 7 is a flow chart of processing of the speech translation apparatus according to the second embodiment. FIG. 8 is an interlingual pronunciation correspondence table used in the second embodiment. FIGS. 9A, 9B and 9C are schematic diagrams showing process to extract pronunciation candidates for unknown words according to the second embodiment.

First, processing of S400~S420 in FIG. 7 corresponds to processing of S200~S220 in FIG. 2 respectively. Accordingly, explanations thereof are omitted.

At S430, as to each element of the unknown word set U, the pronunciation estimation unit 140 acquires a speech sound set W by collecting speech sounds corresponding thereto from the speech recognition result R. Briefly, as to each unknown word as element of the unknown word set U outputted by the unknown word detection unit 130, the pronunciation estimation unit 140 extracts a speech sound of the first language corresponding to the unknown word. For example, as shown in FIG. 9A, by extracting a speech sound "MITO" corresponding to the unknown word "水戸", and by extracting a speech sound "NATTOU" corresponding to the unknown word "納豆", the speech sound set W is acquired.

Next, at S440, the pronunciation estimation unit 140 estimates a pronunciation candidate from the speech sound corresponding to the unknown word, and adds the pronunciation candidate to a pronunciation candidate set P. In the second embodiment, by using the interlingual pronunciation correspondence table shown in FIG. 8, the pronunciation candidate is converted. As a result, as shown in FIG. 9B, as to the Chinese word "水戸", "mi1tou" is estimated. As to the Chinese word "納豆", "na2tou2" is estimated. These estimated candidates are added to the pronunciation candidate set P.

Last, at S440, the dictionary update unit 150 corresponds each unknown word (included in the unknown word set U) with the pronunciation candidate set P estimated by the pronunciation estimation unit 140, and registers these pairs into the speech recognition dictionary 110 of Chinese. In this case, these pairs are collected so as not to overlap with pronunciation candidates acquired at S400-S420. As shown in FIG. 9C, as pronunciation candidates of the Chinese word "水戸" the pronunciation candidate set P including "shui3hu4" and "mi1tou" is acquired. Furthermore, as pronunciation candidates of the Chinese word "納豆", the pronunciation candidate set P including "na4dou4", "na4tuo2" and "na2tou2" is acquired. The dictionary update unit 150 corresponds each unknown word (included in the unknown word set U) with the pronunciation candidate set P, and registers these pairs into the speech recognition dictionary 110 of Chinese.

As a result, for example, when a Japanese speaker actually utters by utilizing this system, a pronunciation similar to this utterance actually heard by a Chinese speaker can be registered into the speech recognition dictionary 110. Accordingly, in response to the utterance actually used by one party (Japanese speaker) in flow of conversation, a word of a pronunciation uttered by the other party (Chinese speaker) can be recognized as a speech. As a result, the speech translation apparatus having higher accuracy of translation can be presented.

For example, after the Chinese speaker hears the Japanese speaker's utterance "NATTOU" in their conversation, the Chinese speaker utters the Chinese word "納豆" by not a Chinese pronunciation "na4dou4" but similar Chinese pronunciation "na2tou2". In this case, by using the speech recognition dictionary 110 updated as mentioned-above, the Chinese word "納豆" can be correctly recognized.

The Third Embodiment

Figure 10:
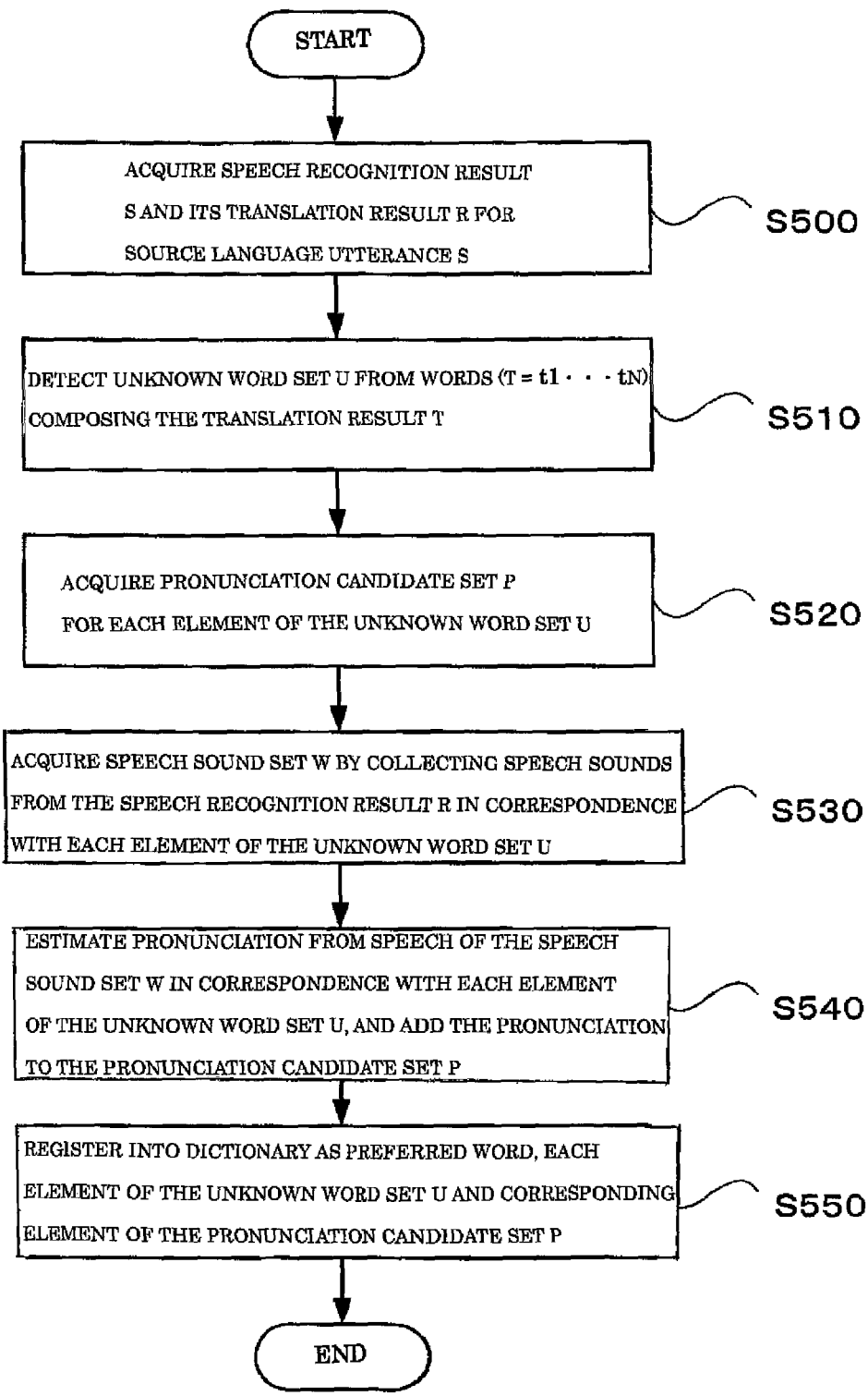
FIG. 10 is a flow chart of processing of the speech translation apparatus according to the third embodiment.
Figures 11, 12:
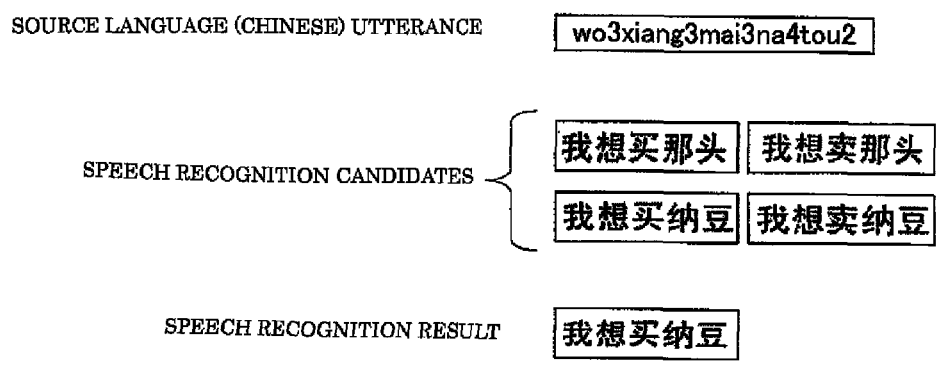
FIG. 11 is one example of a preferred word registered into the speech recognition dictionary according to the third embodiment.
FIG. 12 is one example of preferred speech recognition according to the third embodiment.

Next, registration of preferred words according to the third embodiment will be explained. FIG. 10 is a flow chart of processing of the speech translation apparatus according to the third embodiment. FIG. 11 is one example of preferential registration into the speech recognition dictionary 110. FIG. 12 is one example of preferential speech recognition.

In FIG. 10, processing of S500~S520 corresponds to processing of S200~S220 in FIG. 2 respectively. Furthermore, processing of S530 and S540 corresponds to processing of S430 and S440 in FIG. 7 respectively. Accordingly, explanations thereof are omitted.

At S550, the dictionary update unit 150 corresponds each unknown word (included in the unknown word set U) with a pronunciation candidate estimated by the dictionary update unit 150. Furthermore, this unknown word is registered into the speech recognition dictionary 110 of Chinese as a preferred word against other (already-registered) words having the same pronunciation as the unknown word.

FIG. 11 shows one example of words preferentially registered into the speech recognition dictionary 110. Here, as to the pronunciation "na4tuo2", two candidates having this same pronunciation are registered as follows.

纳豆    那头

Among these two candidates, following word is registered as preference 1 (higher preferred word).

纳豆

In this case, as shown in the upper line of FIG. 12, as to the Chinese utterance "wo3xiang3mai3na4tou2", four speech recognition candidates are extracted as shown in the middle line of FIG. 12. If the Chinese word "纳豆" is set to preference 1, by evaluating a preferred sequence or a likelihood calculated by referring to a language model among the four speech recognition candidates, one speech recognition result is selected as shown in the lower line of FIG. 12. Accordingly, a word matched with a topic is preferentially selected in the speech recognition. As a result, the speech translation can be realized along the topic, and accuracy of the speech interpretation is improved.

In above-mentioned embodiments, indications shown in processing steps can be executed based on program as software. By previously storing this program into a general purpose computer and by reading this program therefrom, the same effect as above-mentioned machine translation apparatus can be acquired. Indications described in above-mentioned embodiments are recorded into a magnetic disk (such as flexible disk, hard disk), an optical disk (such as CD-ROM, CD-R, CD-RW, DVD-ROM, DVD±R, DVD±RW, Blu-ray (registered trademark) Disc), a semiconductor memory or a recording medium similar thereto, as a program executable by a computer. If the recording medium is readable by the computer or an embedded system, the recording format may be any form. When the computer reads the program from this recording medium and executes indications described in the program via CPU, the same operation as the machine translation apparatus of above-mentioned embodiments can be realized. Naturally, the computer may acquire or read the program via a network.

Furthermore, based on indications of the program installed into the computer or the embedded system from the recording medium, OS (Operating System) being operated on the computer, database management software, or MW (Middle Ware) such as the network, may execute a part of each processing to realize the present embodiment.

Furthermore, in the present embodiment, the recording medium is not limited to a medium independent from the computer or the embedded system. By downloading a program transferred via LAN or Internet, a recording medium that stores or temporarily stores the program is included.

Furthermore, the recording medium is not limited to one. If processing of the present embodiment is executed using a plurality of mediums, they are included in the recording medium of the present embodiment. The medium may have any component.

Furthermore, in the present embodiment, the computer or the embedded system is used for executing each processing of the present embodiment, based on the program stored in the recording medium. This may have any component of one apparatus (such as a personal computer, microcomputer) or a system including a plurality of apparatuses connected via the network.

Furthermore, in the present embodiment, the computer is not limited to the personal computer. The computer includes an operation processing apparatus (included in an information processing device), the microcomputer and so on. Briefly, the computer is generically named as the device or the apparatus able to execute functions of the present embodiment by the program.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech translation apparatus comprising:
a speech recognition unit configured to convert a speech of a first language to a source sentence of the first language by recognizing the speech using a speech recognition dictionary,
the speech recognition dictionary storing words of the first language and pronunciation candidates corresponding to the words, and words of the second language and pronunciation candidates corresponding to the words;
a translation unit configured to convert the source sentence to a translation sentence of the second language by using a translation dictionary,
the translation dictionary storing words of the first language and translated words of the second language corresponding to the words;
an unknown word detection unit configured to detect an unknown word of the second language from the translation sentence by using the speech recognition dictionary, the unknown word being unregistered word not stored in the speech recognition dictionary;
a pronunciation estimation unit configured to estimate a first pronunciation candidate of the unknown word from a character string of the unknown word included in the translation sentence by using Text-To-Speech technique, and to estimate a second pronunciation candidate of the unknown word from a pronunciation of an original word included in the source sentence, the original word corresponding to the unknown word; and
a dictionary update unit configured to register the unknown word, the first pronunciation candidate and the second pronunciation candidate, into the speech recognition dictionary correspondingly,
wherein the speech recognition unit recognizes a next speech by using the speech recognition dictionary updated by the dictionary update unit.

2. The apparatus according to claim 1, wherein
the pronunciation estimation unit estimates a third pronunciation candidate of the unknown word from a speech sound included in the speech, the speech sound corresponding to the original word.

3. The apparatus according to claim 1, wherein the dictionary update unit registers the unknown word so as to be preferentially selected than other words already registered into the speech recognition dictionary, the other words corresponding to the first pronunciation candidate or the second pronunciation candidate in the speech recognition dictionary.

4. A speech translation method comprising:
converting a speech of a first language to a source sentence of the first language by recognizing the speech using a speech recognition dictionary,
the speech recognition dictionary storing words of the first language and pronunciation candidates corresponding to the words, and words of a second language and pronunciation candidates corresponding to the words;
converting the source sentence to a translation sentence of the second language by using a translation dictionary,
the translation dictionary storing words of the first language and translated words of the second language corresponding to the words;
detecting an unknown word of the second language from the translation sentence by using the speech recognition dictionary, the unknown word being unregistered word not stored in the speech recognition dictionary;
estimating a first pronunciation candidate of the unknown word from a character string representation of the unknown word included in the translation sentence by using Text-To-Speech technique;
estimating a second pronunciation candidate of the unknown word from a pronunciation of an original word included in the source sentence, the original word corresponding to the unknown word;
registering the unknown word, the first pronunciation candidate and the second pronunciation candidate, into the speech recognition dictionary correspondingly; and
recognizing a next speech by using the speech recognition dictionary updated by the registering.

5. The method according to claim 4, wherein
the estimating a second pronunciation candidate comprises
estimating a third pronunciation candidate of the unknown word from a speech sound included in the speech, the speech sound corresponding to the original word.

6. The method according to claim 5, wherein
the registering comprises
registering the unknown word, the first pronunciation candidate, the second pronunciation candidate and the third pronunciation candidate, into the speech recognition dictionary correspondingly.

7. A non-transitory computer readable medium for causing a computer to perform operations for translating speech, the operations comprising:
converting a speech of a first language to a source sentence of the first language by recognizing the speech using a speech recognition dictionary,
the speech recognition dictionary storing words of the first language and pronunciation candidates corresponding to the words, and words of a second language and pronunciation candidates corresponding to the words;
converting the source sentence to a translation sentence of the second language by using a translation dictionary,
the translation dictionary storing words of the first language and translated words of the second language corresponding to the words;
detecting an unknown word of the second language from the translation sentence by using the speech recognition dictionary, the unknown word being unregistered word not stored in the speech recognition dictionary;
estimating a first pronunciation candidate of the unknown word from a character string of the unknown word included in the translation sentence by using Text-To-Speech technique;
estimating a second pronunciation candidate of the unknown word from a pronunciation of an original word included in the source sentence, the original word corresponding to the unknown word;
registering the unknown word, the first pronunciation candidate and the second pronunciation candidate, into the speech recognition dictionary correspondingly; and
recognizing a next speech by using the speech recognition dictionary updated by the registering.

8. The non-transitory computer readable medium according to claim 7, wherein
the estimating a second pronunciation candidate comprises
estimating a third pronunciation candidate of the unknown word from a speech sound included in the speech, the speech sound corresponding to the original word.

9. The non-transitory computer readable medium according to claim 8, wherein
the registering comprises
registering the unknown word, the first pronunciation candidate, the second pronunciation candidate and the third pronunciation candidate, into the speech recognition dictionary correspondingly.

* * * * *